United States Patent [19]

Weyand

[11] 3,726,407
[45] Apr. 10, 1973

[54] MULTI-STAGE SPIRAL-WOUND FILTER

[75] Inventor: John E. Weyand, Needham, Mass.

[73] Assignee: Millipore Corporation, Bedford, Mass.

[22] Filed: Apr. 22, 1971

[21] Appl. No.: 136,313

[52] U.S. Cl. ................. 210/435, 210/494, 210/497
[51] Int. Cl. ........................................... B01d 27/00
[58] Field of Search ...................... 210/492, 494, 497, 210/336, 435

[56] References Cited

UNITED STATES PATENTS

| | | | |
|---|---|---|---|
| 1,872,430 | 8/1932 | Ericson | 210/494 X |
| 3,487,932 | 1/1970 | Forrester et al. | 210/336 X |
| 2,883,058 | 4/1959 | Jaume | 210/494 X |
| 3,099,240 | 8/1962 | Smith | 210/336 X |
| 2,322,548 | 6/1943 | Sigmund | 210/494 X |

FOREIGN PATENTS OR APPLICATIONS 1,189,159  9/1959  France ........................ 210/494

*Primary Examiner*—Samih N. Zaharna
*Assistant Examiner*—F. F. Calvetti
*Attorney*—Clarence S. Lyon, Esq.

[57] ABSTRACT

A multi-stage filter formed by spirally winding a multi-layer material around a core to form a generally cylindrical construction having two opposing spiral end surfaces. The multi-layer material is formed by at least one filter layer, and at least two spacer layers formed from a material with a high void volume. The layers are arranged so that during use, and in each stage, unfiltered fluid in each layer passing through one spiral surface into one spacer layer must pass through a filter layer prior to passing out of the construction through the opposing spiral end surface. Fluid in each stage passes through the filter in an opposite axial direction than the fluid passing through the filter in adjacent stages.

17 Claims, 4 Drawing Figures

MULTI-STAGE SPIRAL-WOUND FILTER

This invention relates to a multi-stage spiral-wound filter construction.

BACKGROUND OF THE INVENTION

In commonly employed filtration processes, fluids are passed through a succession of filter media having a progressively smaller pore size in the direction of fluid flow so that larger size particles or materials are retained on the filter medium with which the fluid first contacts and particles and materials having progressively smaller sizes are retained on the downstream filter media. By operating in this manner, rapid build up of particles on, and resultant blockage of the smaller pores in the final filter material is prevented. Thus, more efficient use of the relatively more expensive and more fragile smaller pore size filter medium is effected.

Also, in filtration, it is desirable to maximize filter area while minimizing the volume of the filter construction employed. One common means for attaining this result is to provide a construction formed by spirally winding a multi-layer material having a filter layer to form a tightly wound cylinder into which liquid is introduced at one spiral end and removed from the opposite spiral end. Means must be provided in the filter construction for assuring that all entering liquid passes through the filter medium prior to being removed, that is, the entering liquid must be prevented from simply passing through the spaces between the wound filter material without passing through the filter medium. It has been proposed to employ corrugated filter media in spiral wound filter constructions to maximize filter surface area for a given filter construction volume. In these constructions, sealing arrangements are provided at each spiral surface of the wound filter to assure that incoming fluid passes through a filter surface before exiting the cylinder. However, a corrugated spiral wound filter construction has undesirable strength characteristics which has limited its use. When fluid is introduced into the corrugated construction, even under moderate pressure or when filter loading is increased due to particle accumulation, the flutes become compressed along their entire length resulting in severe stress being placed upon the filter material. Under these compression forces, the chances of rupturing the filter material and rendering the construction useless are greatly increased. Due to these undesirable strength characteristics, attainable rate of filtration with these filters is greatly reduced. It would be highly desirable to provide a multi-stage filter construction having a large filter area per unit volume and which permits the use of relatively high filtration pressures without a high risk of rupturing the filter medium.

SUMMARY OF THE INVENTION

The present invention provides a multi-stage spiral-wound filter construction formed by winding a flat multi-layer web and sealing the layers in a configuration assuring that fluid entering the construction through one spiral end surface of each stage passes through at least one filter surface prior to the exit from the construction. The multi-layer web in each stage comprises at least one filter layer and at least two generally flat spacer layers having high void volume and, when employing only one filter layer, at least one fluid-impermeable layer. The spirally-wound construction, in each stage, is selectively sealed at each spiral end surface and along the end widths to assure that fluid entering each stage of the construction through one spiral end surface must pass through a filter layer prior to being removed from the construction through the opposing spiral end surface. In each stage, one set of spacer layers adjacent to or contacting a first surface of each filter layer is open to the atmosphere on the second spiral end surface. A second set of spacer layers contacting the second surface opposing the first surface of each filter layer is open to the atmosphere on the second spiral end surface and closed to the atmosphere on the first spiral end surface. Fluid-impermeable layers, when employed, are positioned to prevent contact of spacer layers open on opposing spiral end surfaces. Fluid exiting from one stage passes into the next adjacent stage through the adjacent spiral end surface. The stages of the filter are sealed from each other so that fluid enters and exits each stage through a spiral end surface. To prevent incoming unfiltered fluid from entering the widthwise edges of the multi-layer construction and intermixing with filtered fluid prior to passing through a filter surface, one of the sets of spacer layers in each stage is sealed from the atmosphere along the widthwise edges adjacent the center of the spiral and remote from the center of the spiral or from the adjacent inner stage. To prevent unfiltered fluid from passing through the center of the spiral, the center of the spiral is sealed adjacent at least one spiral end surface.

BRIEF DESCRIPTION OF THE DRAWINGS

The invention will be more fully described with reference to the accompanying drawings.

DESCRIPTION OF THE SPECIFIC EMBODIMENTS

Figure 1:
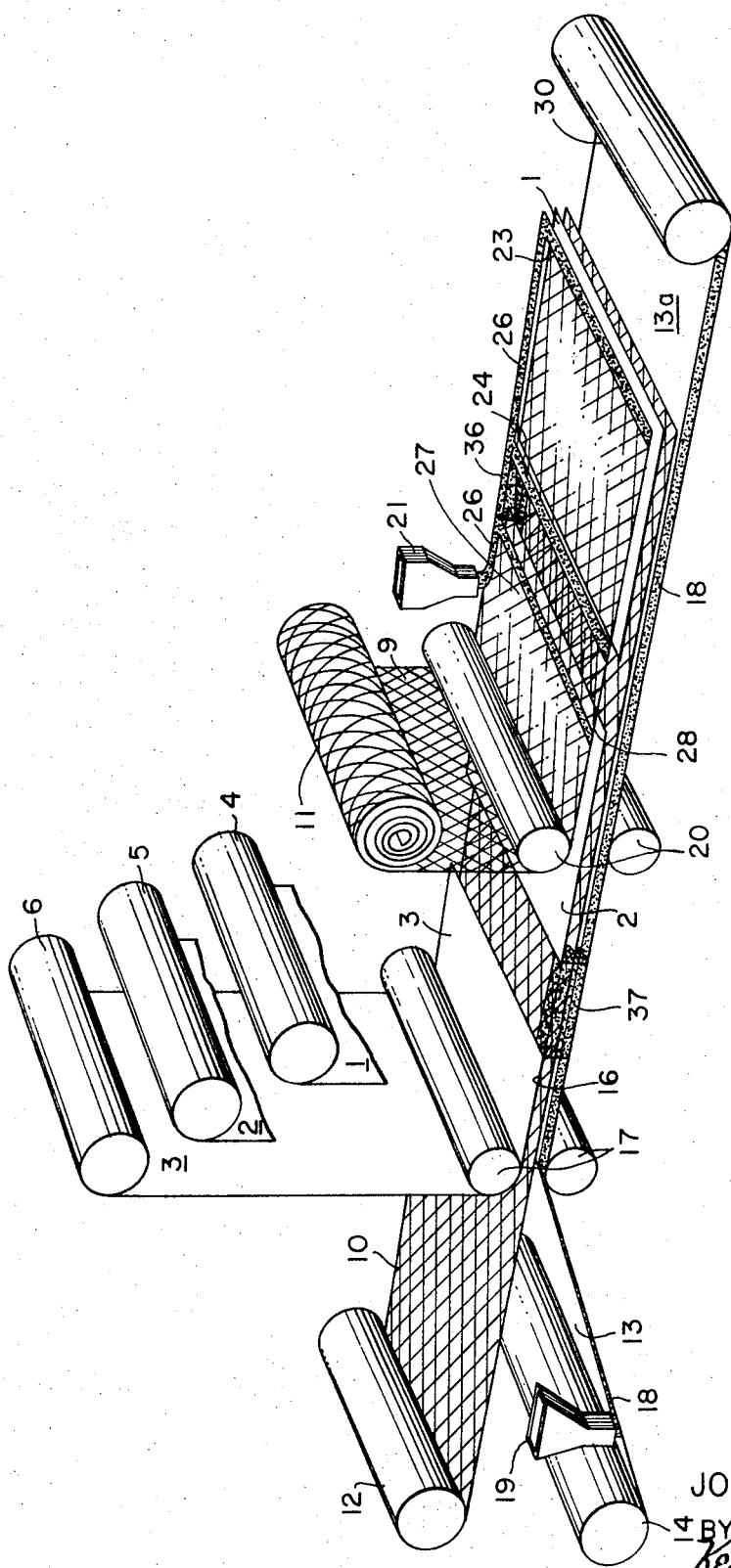
FIG. 1 is a schematic diagram of one method of forming a multi-stage spiral-filter.

Referring to FIG. 1, a three stage filter is formed from three different filter mediums; namely, filter layer 1 having pores of a small average size, filter layer 2 having pores of a medium average size and filter layer 3 having pores of a relatively large average size. Filter layer 1 is stored on storage roller 4, filter layer 2 is stored on storage roller 5 and filter layer 3 is stored on storage roller 6. The spacer layers 9 and 10 are stored respectively on storage rollers 11 and 12. A fluid-impermeable layer 13 is stored on storage roll 14. The spacer layers 9 and 10 and the fluid-impermeable layer 13 are employed along the entire length of the filter construction. A multi-layer web 16 is formed from a filter layer 1, 2 or 3, a spacer layer 10 and a fluid-impermeable layer 13 by passing the desired filter layer, spacer layer and fluid-impermeable layer between a set of rollers 17. An adhesive strip 18 is dispensed from dispenser 19 and placed upon moving fluid-impermeable layer 13 as it is unrolled from storage roller 14 so that when contacted with spacer layer 10 and filter layer 1, 2 or 3, a seal is formed adhering the three layers as they pass between rollers 17. The spacer layer 9 is unrolled from storage roller 11 and passes, together with multi-layer web 16 through rollers 20. Adhesive material is dispensed from dispenser 21 to form widthwise strip 23, 24 and 25 and others, not shown, at each of the leading or following widthwise edges of the filter layers 1, 2 and 3, and adhesive strip 26 along the lengthwise edge of each filter layer 1, 2 and 3. When the multi-layer web 27, formed from the two spacer layers 9 and 10, the fluid-impermeable layer 13 and a filter layer 1, 2 or 3, is wound on filter core 30, the core 30 is wrapped with layer 13a for one revolution of core 30. The adhesive strip 18 will contact and adhere to the circumference of the core 30 and, after one revolution of the core 30, the under surface of layer 13a will contact the adhesive strip 23 and will adhere to space layer 9 and filter layer 1. As multi-layer web 27 is rolled onto core 30, adhesive strips 26, 24 and 25 contact the underside of fluid-impermeable layer 13 to adhesive layers 13, 9 and 1, 2 or 3. The adhesive sealants 36 and 37 are deposited on opposing lengthwise edges between the filter layers to provide the desired sealing between the filter stages, in a manner more fully described below.

Figure 2:
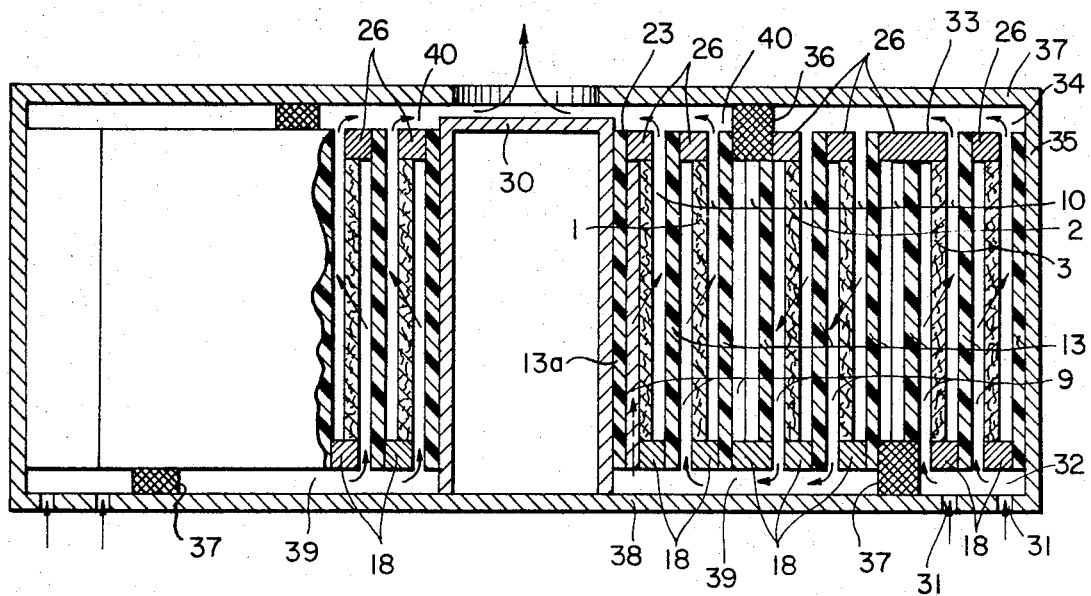
FIG. 2 is a partial vertical cross sectional view of the spiral filter formed from the multi-layer web shown in FIG. 1.

The fluid flow path for the filter shown in FIG. 1 will be described with reference to FIG. 2. Incoming fluid enters space 32 through ports 31 and passes upwardly through spacer layer 9. Since the top of the spacer layer 9 is sealed from the atmosphere by adhesive 26, fluid passes from spacer layer 9 through filter layer 3 into spacer layer 10 and out of the top surface 33 of the filter construction. The fluid is retained in space 34 by means of sidewall 35, adhesive 36 and top wall 37. The fluid obtained from the first stage of the filter employing filter layer 3 then is passed to the second stage of the filter employing filter layer 2. The fluid passes downwardly through spacer layer 10, through filter layer 2 and into spacer layer 9. The filtered fluid passes out of spacer layer 9 in the second stage into space 36 defined by adhesive 37, bottom wall 38 and core 30. The filtered fluid from the second stage then passes into the third stage which employs filter layer 1. In the third stage, the fluid flows upwardly in spacer multi-layer web which is wound on core 30. The filtered fluid passes out of the third stage from spacer layer 10 into the space 40 defined by the top of the filter construction, adhesive layer 36 to top wall 37 and core 30. The filtered fluid then passes out of opening 41 in the top wall 37.

Figure 3:
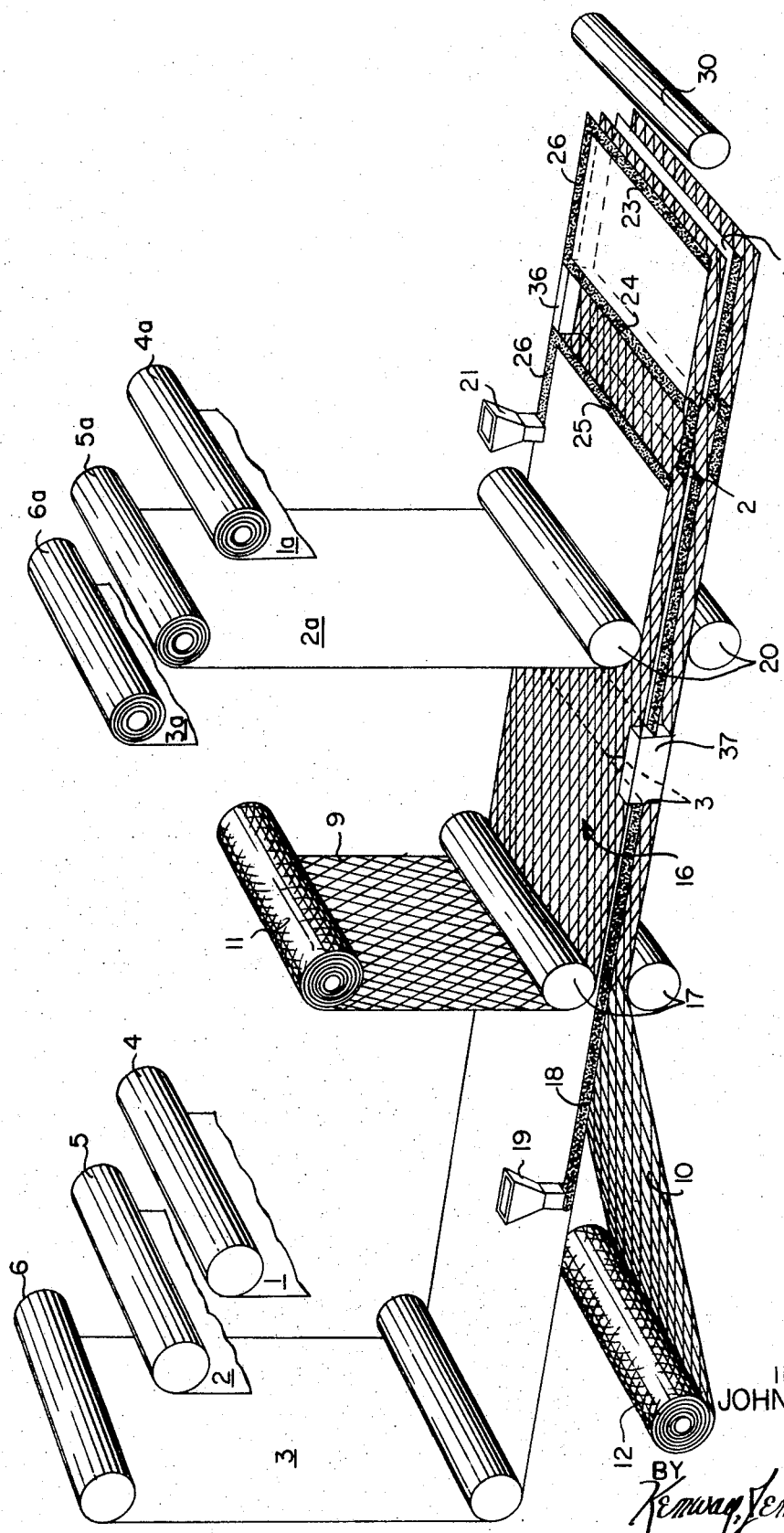
FIG. 3 is a schematic diagram of a method of forming a preferred multi-stage spiral filter.

FIG. 3 shows a method for forming a spiral wound filter having at least two filter layers and two spacer layers while eliminating the need for a fluid-impermeable layer. The fluid flow path of the filter formed by winding the web of FIG. 3 is described with reference to FIG. 4. For convenience, the elements in FIGS. 3 and 4 common to those in FIGS. 1 and 2 will be numbered the same.

As shown in FIG. 3, the filter layers 1, 2, 3, 1a, 2a and 3a are stored respectively on rollers 4, 5, 6 and 4a, 5a, and 6a respectively. Filter layers 1 and 1a have pores of a small average size, filter layers 2 and 2a have pores of a medium average size and filter layers 3 and 3a have pores of a large average size. The spacer layers 9 and 10 are stored respectively in rolls 11 and 12. A multi-layer web 16 formed from spacer layers 9 and 10 and any of filters 1, 2 or 3 are passed through the rollers 17 after an adhesive strip 18 is dispensed from dispenser 19 between the filter layer 1, 2 or 3 and the spacer layer 9. The multi-layer web 16 thus formed is passed through rollers 20 in contact with filter 1a, 2a or 3a. The resultant multi-layer web then is passed under the dispenser 21 which dispenses a strip of adhesive 26 along the lengthwise edge of each filter layer 1a, 2a or 3a and widthwise strips 23, 24 and 25 along each forward or following widthwise edge of each filter layer 1a, 2a or 3a. The relative proportion of the resultant spiral wound filter occupied by the respective filter layers 1, 2 and 3 is easily regulated by the length of the filter layers 1, 2 or 3.

Figure 4:
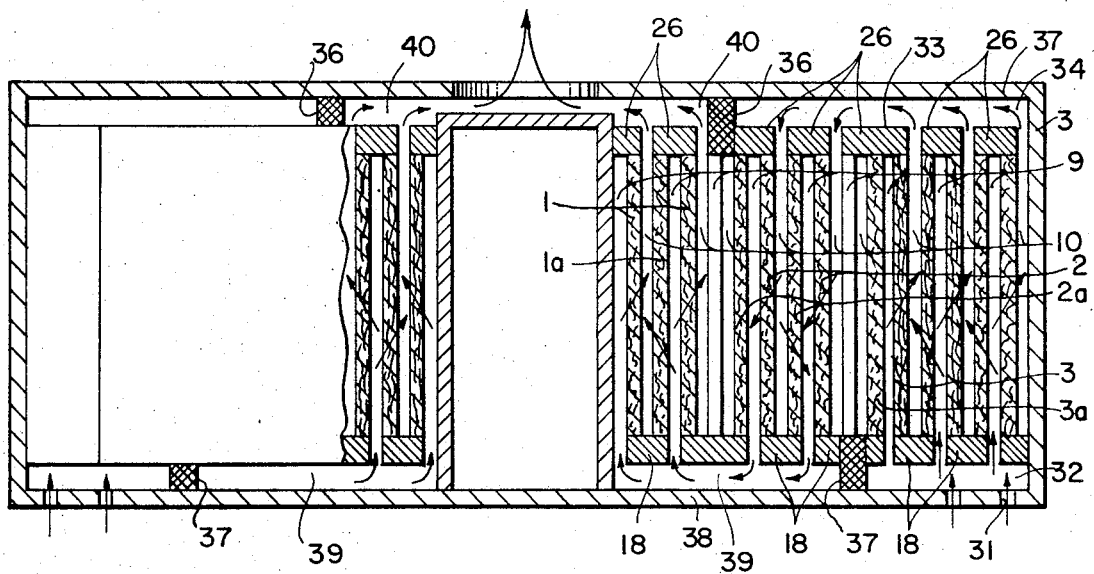
FIG. 4 is a partial vertical cross sectional view of the spiral filter formed from the multi-layer web shown in FIG. 3.

As shown in FIG. 4, incoming fluid enters space 32 through ports 31 and passes upwardly through spacer layer 9. Since the top of the spacer layer 9 is sealed from the atmosphere by adhesive 26, fluid passes from spacer 9 through filter layers 3 and 3a into spacer 10 and out of the top surface 33 of the filter construction. The fluid is retained in space 34 by means of sidewall 35, adhesive 36 and top wall 37. The fluid obtained from the first stage of the filter employing filter layers 3 and 3a then is passed to the second stage of the filter employing filter layer 2 and 2a. The fluid passes downwardly through spacer layer 10, through filter layers 2 and 2a and into spacer layer 9. The filtered fluid passes out of spacer 9 in the second stage into space 39 defined by adhesive 37, bottom wall 38 and core 30. The filtered fluid from the second stage then passes into the third stage container filter layers 1 and 1a. In the third stage, the fluid flows upwardly in spacer layer 9, through filter layers 1 and 1a and into spacer layer 10. The filtered fluid passes out of the third stage from spacer layer 10 into the space 40 defined by the top of the filter construction, adhesive layer 36 to top wall 33 and core 30. The filtered fluid then passes out of opening 41 in the top wall 33.

The fluid-impermeable layer, when employed, can comprise any flexible material sufficiently strong to prevent fluid passage even at high pressures. It is desirable that this layer, as well as the filter layer, be relatively thin to maximize filter surface area for a given filter volume. Particularly suitable liquid-impermeable materials include polyvinyls such as polyvinyl chloride, polyvinyl acetate, polyolefins such as polyethylene and polypropylene and polyesters. The spacer layers can comprise either a woven or nonwoven material having a high void volume, which permits fluid transfer at reasonable high rates without the need for high inlet pressures. In addition, the spacer layer should have a thickness sufficiently great to permit substantial fluid flow rates but not so thick as to reduce filter surface area and filter capacity substantially for a given filter volume. It is preferred that the spacer layer be between about 0.020 and 0.030 inches thick. Suitable spacer layers include netting formed from plastic materials, cloth, paper or the like. A particularly suitable spacer layer comprises a netting formed by two sets of parallel plastic strands, one set of strands is lain on and adhered to one surface of the other set in an arrangement so that the sets of strands intersect at an angle. A suitable netting is available under the tradename Vexar from E. I. duPont deNemours & Co. This structure when placed adjacent two flat filter layers or one flat filter layer and a flat impermeable layer has each set of strands in contact with only one adjacent flat layer so that fluid can pass easily into the spacer layer and between the two flat layers. This structure and its operation are described more fully in a copending application of James L. Dwyer and Peter A. Reiman entitled "Spiral-Wound Filter" and filed Apr. 22, 1971, Ser. No. 136,315.

The filter layer must be sufficiently pliable to permit winding it around the core without fracturing the filter. While many filter materials are sufficiently pliable for this purpose, some filter materials are too brittle to afford their use and must be modified prior to being incorporated in the laminate. Such filter materials include microporous materials formed from cellulose esters such as cellulose acetate and cellulose nitrate and having an average pore size extending into the submicrometer range as small as about 0.025 micrometer, marketed by Millipore Corporation and identified as Duralon(R) filters Mitex(R) filters, Polyvic(R) filters, MF — Millipore(R) filters, Celotate (R) filters, Solvinert(R) filters and Microweb(R) filters. To render these filters sufficiently pliable, they are laminated between two pliable porous materials, such as woven cloth formed with polyester fiber, with a net adhesive formed with heat-sealable resin fiber such as polyamide, polyester or polyethylene fibers. Particularly suitable laminates and their methods of preparation are disclosed in a patent application of Robert V. Tanona and Peter A. Reiman entitled "Filter Laminate Construction" filed Apr. 22, 1971, Ser. No. 136,309. However, it is to be understood that the present invention is not limited to the use of microporous filter layers but includes the use of any flat filter medium that can be wound in the desired configuration shown.

The type and amount of adhesive employed is such that adhesive will penetrate into the filter layer when applied but not through the filter layer so that sealing on one surface of the filter layer does not result in sealing of both filter surfaces. Epoxy or polyurethane based adhesives are particularly useful for providing the desired sealing.

It is to be understood that the present invention is not limited to the structures specifically described but includes obvious modifications thereof. Thus, a filter construction can be prepared by spirally winding a multi-layer web having more than one fluid-impermeable layer more than one filter layer and more than two spacer layers so long as they are arranged so that spacer layers sealed on opposing surfaces do not contact. For example, a multi-layer web to be wound can comprise a fluid-impermeable layer, two filter layers, and three spacer layers wherein the spacer and filter layers are alternated through the web thickness. However, these structures may increase production problems due to the added webs being unrolled and adhesive strips applied. Therefore, it is preferred to form the filter by winding a four layer web as specifically described above.

Furthermore, it is to be understood that the spacer layers need not be as wide as the filter layers and the fluid-impermeable layers. Filter layers or a filter layer and fluid-impermeable layer contact opposing surfaces of a spacer layer can be sealed at the spiral end surfaces without adhering the spacer layer. All that is necessary is that the seal prevent the entrance or exit of fluid where desired. However, since the spacer layer provides essential support to the adjacent filter it must contact at least a relatively large portion of the filter surface area so that the risk of rupturing the filter layer is not increased substantially. Furthermore, any means for forming a seal can be employed such as heat sealing.

While the present invention provides a filter having improved strength characteristics primarily because the filter layer is flat and is supported, the spacer layers need not be of uniform thickness. This invention contemplates the use of spacer layers tapered along their width so that the spiral end surface facing incoming unfiltered fluid will have open relatively wide spacer layers having a gradually decreasing width along the axial length of the wound filter. The adjacent spacer layer sealed on the spiral end surface facing incoming unfiltered fluid will be tapered in the opposite direction along the axial length of the wound filter. By employing the tapered spacer layers, fluid can more easily enter and exit the wound filter without greatly increasing its volume.

Furthermore, a solid core, although preferred, is not required in forming the spiral filter construction. If desired, the multi-layer web can be wound around a mandrel that is subsequently removed and the resultant central space is sealed so that unfiltered fluid cannot by-pass a filter layer. The flow of fluid also can be reversed so that fluid initially is introduced into the centermost stage of the filter construction with the radially outermost stage comprising the last filter stage.

In addition, the lengthwise edge of the filter layer upon which are placed the lengthwise adhesive strips 26 and 18 can be reversed between stages so that the same spacer layer 9 or 10 can function as the fluid inlet in all stages. However, the adhesive layers are not applied on the same filter surface at different lengthwise edges because the desired filter flow will not be obtained.

In addition, the adhesive configuration for the outer stage of the filter can be modified as described in a copending application entitled "Spiral-Wound Filter" of Peter A. Reiman and Paul J. Cook, filed concurrently herewith.

Thus, the present invention provides a filter construction which permits the treatment of fluids by passing the fluids sequentially through a plurality of filters having varying pore size in a configuration having a large filter surface area per unit volume. Accordingly the present invention provides substantial economic and operating advantages in that the spiral-wound construction does not require the use of a small pore size filter layer uniformly throughout the filter unit thereby reducing the cost and the rate at which filter plugging occurs.

I claim:

1. A spiral filter construction formed from a spirally-wound multi-layer material, said construction having a center and two opposed spiral end surfaces, said multi-layer material including at least one flat filter layer and at least two generally flat spacer layers; each filter layer being formed from a plurality of flat filters spaced apart from each other to thereby form a plurality of coaxial filter stages, the spacer layers being sealed so that a first set of spacer layers contacting each filter layer on a first surface is open to the atmosphere on a first spiral end surface and closed to the atmosphere on the second spiral end surface and a second set of spacer layers contacting the second surface of each filter layer is open to the atmosphere on the second spiral end surface and closed to atmosphere on the first spiral end surface, said spacer layers being arranged so that spacer layers open on opposing spiral end surfaces do not contact, the first set of spacer layers in each stage being sealed along the widthwise edges, the center of said spiral being sealed from the atmosphere adjacent at least one spiral end surface, and the stages being sealed to effect fluid flow in adjacent stages in opposite directions along the major axis of the construction.

2. A spiral filter construction formed from a spirally-wound multi-layer material, said construction having a center and two opposed spiral end surfaces, said multi-layer material including at least two flat filter layers and at least two generally flat spacer layers; each of said filter layers being formed from a plurality of flat filters spaced apart from each other to thereby form a plurality of coaxial filter stages, the spacer layers in each stage being sealed so that a first set of spacer layers contacting each filter layer on a first surface is open to the atmosphere on a first spiral end surface and closed to the atmosphere on the second spiral end surface and a second set of spacer layers contacting the second surface of each filter layer is open to the atmosphere on the second spiral end surface and closed to the atmosphere on the first spiral end surface, said spacer layers being arranged so that spacer layers open on opposing spiral end surfaces do not contact, the first set of spacer layers in each stage being sealed along the widthwise edges, the center of said spiral being sealed from the atmosphere adjacent at least one spiral end surface, and the stages being sealed to effect fluid flow in adjacent stages in opposite directions along the major axis of the construction.

3. A spiral filter construction formed from a spirally-wound multi-layer material, said construction having a center and two opposed spiral end surfaces, said multi-layer material including at least one flat filter layer at least one fluid-impermeable layer and at least two generally flat spacer layers; each of said filter layers being formed from a plurality of flat filters spaced apart from each other to thereby form a plurality of coaxial filter stages, the spacer layers in each stage being sealed so that a first set of spacer layers contacting each filter layer on a first surface is open to the atmosphere on a first spiral end surface and closed to the atmosphere on the second spiral end surface and a second set of spacer layers contacting the second surface of each filter layer is open to the atmosphere on the second spiral end surface and closed to the atmosphere on the first spiral end surface, said spacer layers being arranged so that spacer layers open on opposing spiral end surfaces do not contact, the first set of spacer layers in each stage being sealed along the widthwise edges, the center of said spiral being sealed from the atmosphere adjacent at least one spiral end surface, and the stages being sealed to effect fluid flow in adjacent stages in opposite directions along the major axis of the construction.

4. The construction of claim 1 wherein the multi-layer web is wound around a solid core extending the width of the web, said core being sealed from the atmosphere adjacent at least one spiral end surface.

5. The construction of claim 2 wherein the multi-layer web is wound around a solid core extending the width of the web, said core being sealed from the atmosphere adjacent at least one spiral end surface.

6. The construction of claim 3 wherein the multi-layer web is wound around a solid core extending the width of the web, said core being sealed from the atmosphere adjacent at least one spiral end surface.

7. The construction of claim 2 wherein the multi-layer web comprises two filter layers and two spacer layers.

8. The construction of claim 7 wherein the multi-layer web is wound around a solid core extending the width of the web, said core being sealed from the atmosphere adjacent at least one spiral end surface.

9. The filter construction of claim 1 wherein the filter layers in one stage each comprise a laminate comprising a microporous filter material each surface of which is adhered to a macroporous flexible layer with a fibrous adhesive.

10. The filter construction of claim 2 wherein the filter layers in one stage each comprise a laminate comprising a microporous filter material each surface of which is adhered to a macroporous flexible layer with a fibrous adhesive.

11. The filter construction of claim 3 wherein the filter layers in one stage each comprise a laminate comprising a microporous filter material each surface of which is adhered to a macroporous flexible layer with a fibrous adhesive.

12. The filter construction of claim 7 wherein the filter layers in one stage each comprise a laminate comprising a microporous filter material each surface of which is adhered to a macroporous flexible layer with a fibrous adhesive.

13. A filter construction comprising the spiral filter construction of claim 1 and a housing to enclose said filter, said housing having an inlet and an outlet and means for sealing the outside cylindrical surface of said filter from said outlet.

14. A filter construction comprising the spiral filter construction of claim 2 and a housing to enclose said filter, said housing having an inlet and an outlet and means for sealing the outside cylindrical surface of said filter from said outlet.

15. A filter construction comprising the spiral filter construction of claim 3 and a housing to enclose said filter, said housing having an inlet and an outlet and means for sealing the outside cylindrical surface of said filter from said outlet.

16. A filter construction comprising the spiral filter construction of claim 7 and a housing to enclose said filter, said housing having an inlet and an outlet and means for sealing the outside cylindrical surface of said filter from said outlet.

17. A filter construction comprising the spiral filter construction of claim 9 and a housing to enclose said filter, said housing having an inlet and an outlet and means for sealing the outside cylindrical surface of said filter from said outlet.

* * * * *